(12) United States Patent
Kaplan

(10) Patent No.: US 6,885,665 B2
(45) Date of Patent: Apr. 26, 2005

(54) METHOD FOR DISTRIBUTING CALLS TO A GROUP OF END POINTS

(75) Inventor: Alan Edward Kaplan, Morris Township, NJ (US)

(73) Assignee: AT&T Corp., New York, NY (US)

( * ) Notice: Subject to any disclaimer, the term of this patent is extended or adjusted under 35 U.S.C. 154(b) by 818 days.

(21) Appl. No.: 09/727,320

(22) Filed: Nov. 30, 2000

(65) Prior Publication Data

US 2002/0093959 A1 Jul. 18, 2002

(51) Int. Cl.[7] .............................. H04L 12/56; H04J 3/26; H04M 7/00; H04M 3/00; H04M 5/00
(52) U.S. Cl. ..................... 370/390; 370/389; 370/432; 379/219; 379/269
(58) Field of Search .............................. 370/216–227, 370/270–352, 389–410, 432–435; 379/219–229, 265–269, 309–315; 714/4, 16

(56) References Cited

U.S. PATENT DOCUMENTS

| | | | | |
|---|---|---|---|---|
| 4,689,815 A | * | 8/1987 | Grewal et al. ............... | 379/269 |
| 5,537,470 A | * | 7/1996 | Lee ........................ | 379/265.11 |
| 5,592,542 A | * | 1/1997 | Honda et al. ............. | 379/266.05 |
| 5,787,160 A | * | 7/1998 | Chaney et al. ........... | 379/112.06 |
| 5,787,163 A | * | 7/1998 | Taylor et al. ............ | 379/266.08 |
| 5,920,621 A | * | 7/1999 | Gottlieb .................. | 379/112.01 |
| 6,014,382 A | * | 1/2000 | Takihiro et al. ............. | 370/399 |
| 6,091,811 A | * | 7/2000 | Chang et al. ............ | 379/265.02 |
| 6,173,053 B1 | * | 1/2001 | Bogart et al. ........... | 379/266.01 |
| 6,404,864 B1 | * | 6/2002 | Evslin et al. ............ | 379/112.01 |
| 6,661,882 B1 | * | 12/2003 | Muir et al. ............. | 379/127.01 |
| 6,711,255 B1 | * | 3/2004 | Berrondo et al. ....... | 379/266.06 |
| 6,735,299 B1 | * | 5/2004 | Krimstock et al. ..... | 379/265.11 |

* cited by examiner

Primary Examiner—Man U. Phan
(74) Attorney, Agent, or Firm—Henry T. Brendzel

(57) ABSTRACT

A switching apparatus distributes incoming calls to end point terminals that belong to a service group and that interact with the switching apparatus via messages. The messages query the end point terminals by specifying a range and asking those end point terminals that meet a criterion associated with the range to respond. By iteratively narrowing the range, for example, in a binary search fashion, one of the end point terminals is selected. In one embodiment, the range relates to fixed sequence IDs of the end point terminals and the criterion relates to whether an end point terminal is idle or not. In another embodiment, the range incorporates the idle/not idle state of the end point terminals by specifying idle time durations.

3 Claims, 1 Drawing Sheet

METHOD FOR DISTRIBUTING CALLS TO A GROUP OF END POINTS

BACKGROUND OF THE INVENTION

This invention relates to methods for selecting terminals with which telecommunication connections are established. These methods are typically employed in connection with groups of terminals, sometimes staffed with human operators, that are charged with performing certain selected tasks and which, generally are fungible. That is, it is unimportant to which of the terminals an incoming call is connected.

One such method is normally referred to as "hunting." It refers to the notion that when there is a group of terminals, for example, telephones on a group of desks in an insurance company's office, an incoming call is connected to a switching apparatus, that steps through the group of telephones, in a predetermined sequence, starting with the first telephone in the sequence, to find the first telephone that is not busy. The incoming call is then connected to that telephone. When a non-busy telephone is not found when the switching apparatus reaches the end of the sequence, the incoming caller is sent a "busy" signal. This method is sometimes called linear hunting.

Another method, which is closely related, is sometimes called circular hunting. In circular hunting the switching apparatus also steps sequentially through the sequence of telephones in the group, but rather than start with the first telephone in the sequence, the switching apparatus starts with the line succeeding the last telephone that was connected. When the switching apparatus reaches the end of the sequence without finding a non-busy telephone, the hunting for a non-busy telephone continues from the beginning of the sequence. A "busy" signal is sent to the incoming call only when the switching apparatus hunting returns to the telephone from whence the hunting began. One can think of it as hunting in modulus arithmetic, with the modulus being the number of telephones in the group.

It is quite clear that linear hunting burdens the telephones at the beginning of the sequence more than the telephones at the end of the sequence. Circular hunting distributes the burden more evenly. However, circular hunting does not take into account the idle times of telephones and, therefore, even circular hunting has the potential for utilizing the telephones in the group in an uneven manner. When human operators staff the telephones, every effort needs to be made to utilize all of the telephones in the group as evenly as possible, because one want to burden the operators who use the phones fairly.

Still another method that is employed for allocating communication, which takes into account idle times is called automatic call distribution. Switching apparatus that performs the automatic call distribution is normally call an automatic call distributor, or ACD. The ACD keeps track of the busy/idle state of the telephones in the group, and the durations of the idle time. When a call comes in, it is routed to the idle telephone with the longest idle time. If none are idle, then a "busy" signal may be returned or, in some systems, the caller may be placed in a queue.

In each one of the above-described methods, the switching apparatus knows the busy/idle state of the telephones in the group, knows the number of telephones in the group, and all of the telephones in the group are actually connected to the switching apparatus.

It is desirable to have similar capabilities in a distributed environment, where there is no switch that knows the status of any of the elements in the hunt group, ACD, or circular hunt group. Packet switching systems, for example, often don't have state information about the network's end points (terminals) that are connected to the various switches, and/or routers, in the packet switched network.

SUMMARY

An advance in the call-distributing art is achieved with a switching apparatus that distributes incoming calls to end points that belong to a service group and that interact with the switching apparatus via messages, such as packets; for example, in an Asynchronous Transfer Mode (ATM) environment. Advantageously, each end point in the service group knows that it is in the service group and knows it's sequential position in the service group; i.e., each end point has a sequence ID. Also advantageously, the switching apparatus (or a server that does polling on the terminals in the group) knows the number of end points in the service group, for example, N.

Linear hunting, illustratively, is achieved by the switching apparatus (or some polling proxy) sending a query packet to the network to which all of the end points are coupled, requesting that idle end points with a sequence ID between 1 and $\lfloor N/2 \rfloor$ send a reply packet. The $\lfloor \; \rfloor$ symbol represents the truncation operation; for example, $\lfloor 9/2 \rfloor = 4$. If there are any such idle end points, a reply packet is received by the switching apparatus. If a reply packet is received, the switching apparatus knows that there is an idle end point in the first half (accurate to within the truncation error) of the group of end points, and proceeds to send a second query packet, requesting that idle end points with a sequence ID between 1 and $\lfloor N/4 \rfloor$ send a reply packet. If a reply packet is not received in response to the initial query packet, then the second query packet requests that idle end points with a sequence ID between $\lfloor N/2 \rfloor + 1$ and N send a reply packet. In this manner, after log N number of query packets (rounded up to the next integer), the switching apparatus knows which end point is the appropriate end point to be utilized.

Circular hunting, illustratively, is achieved in the same way, except that an offset number is provided to the end points, and the idle end points employ this offset number, in modulus arithmetic, to determine whether to response or not.

ACD operation is achieved by, illustratively, polling the end points, in a binary search manner, for the end point with the longest idle time.

DETAILED DESCRIPTION

Figure 1:
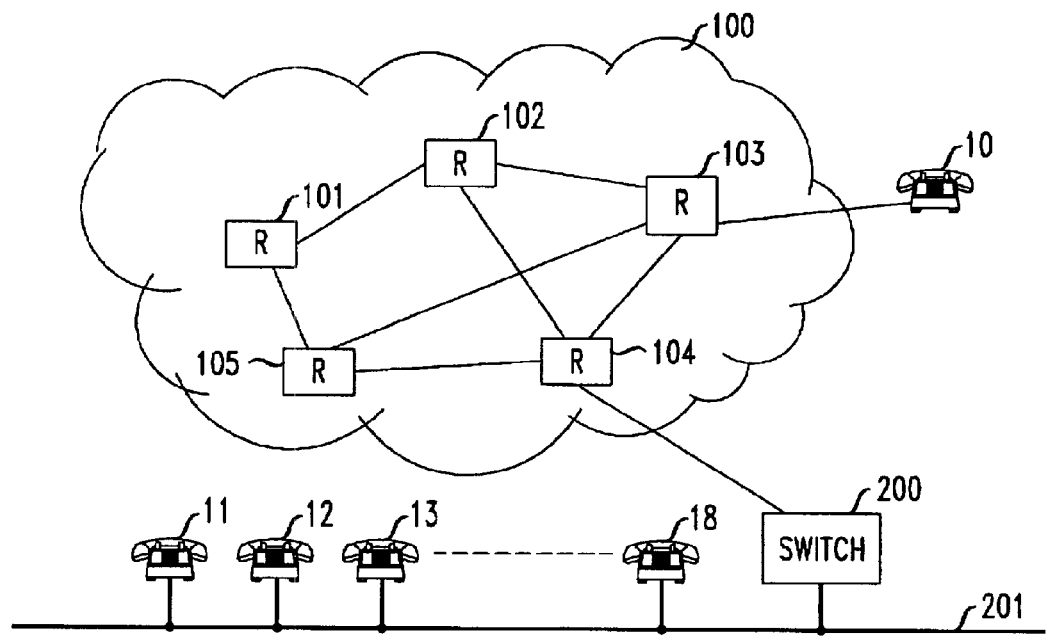
FIG. 1 presents one illustrative embodiment in accord with the principles of this invention.

FIG. 1 presents an illustrative arrangement for practicing the principles disclosed herein. It depicts a packet network 100 with routers 101 through 105, with end point terminal 10, e.g., a telephone, connected to router 101, and switching apparatus 200 connected to router 104. Switching apparatus 200 implements the principles disclosed herein and is shown connected packet bus 201 (e.g., an Ethernet bus), to which end point terminals 11 through 18, e.g., telephones, are connected. In the illustrative embodiments disclosed below, telephone 10 wishes to place a call to a party that serves its customers though telephones 11 through 18, which make up a service group. Advantageously, each of the telephones in the service group possesses a sequence ID, which allows the telephones in the service group to be addressed in a shorthand manner. In the case of the FIG. 1 arrangement, the sequence IDs illustratively are 1, 2, . . . 8. Telephones 11–18 are instruments that are adapted to provide voice communication through signals transmitted in packet format. In addition telephones 11 are able to receive query message, perform some fairly simple operations, such as comparisons (and in some embodiment, modulus addition). The construction of such telephone instruments is well known in the art, and it typically includes a stored program controlled microprocessor. Implementing the principles of this invention imposed an extremely small additional processing burden on the microprocessor. It is noted that the use of a packet network in the FIG. 1 illustrative embodiment is selected for exposition purposes, and that the principles of this invention are applicable to other types of networks as well.

Linear Hunting

When telephone 10 wishes to place a call to a provider that is connected to network 100 by switching apparatus 200, the apparatus needs to respond as to whether it is able to support a connection, or is busy. It is able to support a connection when at least one of the telephones 11–18 is idle, and it is busy when none of the terminals 11–18 is idle. The following program finds the idle terminal with the lowest sequence ID, which the linear hunting schema selects as the telephone to be used (TBU telephone). In this program, which implements a binary search, X designates the condition that telephones with a sequence ID between Low and Mid, inclusively, have been polled and at least one telephone responded that it is idle.

```
1              Low=1; Mid=N
2   Repeat:    IF (X) THEN
3                  High = Mid
4              ELSE
5                  Low = Mid+1
6              END IF
7              IF Low > N THEN
8                  Send "busy" message; Go to End
9              ELSE IF High = Low THEN
10                 Terminal that sent message is the TBU terminal
11             ELSE
12                 Mid=⌊(Low + High)/2⌋; Go to Repeat
13  End:       END IF
```

To briefly review the program, the interval under consideration spans from the telephone with a sequence ID=Low to the telephone with the sequence ID=Mid, inclusively. In the initial pass, the interval under consideration spans the entire set of telephones, from 1 to N. When an idle telephone is found, control passes to line 3 of the program where High=N. When no idle telephone is found, control passes to line 5 of the program, where Low is set to N+1 (since Mid=N). Line 7 detects the condition of no idle telephone being available, and line 8 sends out a "busy" message and proceeds to the end of the program. When an idle telephone is present, control passes to line 9, which ascertains whether High=Low. If so, there can be only one telephone that responded that it is idle, that being the telephone with sequence ID=High=Low. Consequently, that telephone is identified as the TBU telephone. Otherwise, control passes to line 12, where a new Mid value is computed, and control returns to line 2.

The process carried out in step 34 involves communication. That is, the terminals in the specified range of sequence IDs need to be polled as to whether any of them are idle. In accordance with one illustrative embodiment, the polling is executed by multicasting a query packet that specifies the sequence ID range of terminals that are requested to respond. Telephones 11–18, in turn, are arranged to respond to query messages with different delays. The consequence of the different delays is that messages initiated by the telephones in response to a multicasted (or broadcasted) query from switching apparatus 200 do not collide with each other. Alternatively, the telephones may be arranged to respond with a randomized delay. In the random collisions are possible but are rare.

More specifically, the determination as to whether a telephone exists with a sequence ID in a given range is determined by switching apparatus 200 multicasting a query message on bus 201, effectively stating "if your sequence ID is greater than or equal to Low and less or equal to Mid, and you are idle, please send an affirmative reply." Each of the telephones on bus 201, if it is idle, accepts the multicast message and determines, in accordance with conventional processing and based on its stored sequence ID, whether the multicast query is addressed to itself. If so, the telephone waits for a short preassigned (or random) delay interval and sends out a reply message, unless it receives a countervailing "cancel query" or a subsequent multicast message (which is treated as an implied "cancel query" message).

In response to a multicasted query message, switching apparatus 200 can expect a number of affirmative replies—up to the number of telephones in the interval. However, switching apparatus needs to know only whether there exists at least one idle telephone (at which point switching apparatus 200 knows that control must be passed to step 36). Therefore, speed benefits accrue by ignoring all replies other than the first. Alternatively, switching apparatus 200 can instruct all terminals to cancel their replies; i.e. send a "cancel query" message, as mentioned above, that is addressed to all end point terminals or addressed identically to the telephones addressed in the initial query message.

Circular Hunting

When switching apparatus 200 is conditioned to effect circular hunting, the basic process is the same.

In accordance with a first illustrative embodiment, switching apparatus 200 operates pursuant to the above-described program, but the query message that switching apparatus 200 multicasts includes an offset value K, which is the sequence ID of the last-selected end point terminal, plus 1. While, and the query message still effectively states: "if your sequence ID is greater than or equal to Low and less or equal to Mid, and you are idle, please send an affirmative reply," each telephone subtracts the value of K from its true sequence ID to obtain a sequence ID that it uses in determining whether to respond to the multicast query message. The subtraction is carried out in modulus N arithmetic. For example, if N=16 and the last telephone selected by switching apparatus 200 is 10, then the sequence ID of the telephones (for response purposes) are set to ID'=(ID−K)$_{mod\ N}$, which leads to the telephone with sequence ID equal to 11 having a sequence ID for response purposes, ID', equal to 1. To give another example, a telephone with sequence ID equal to 3 computes the sequence ID for response purposes, ID', equal to $(3-10)_{mod\ N}=(-7)_{mod\ N}=9$.

Another embodiment breaks the search for an idle telephone into two binary searches: a first search from K to N, and if it is unsuccessful, a second search from 1 to K−1. This removes the need for performing modulus arithmetic at the telephones but, potentially, increases the number of iterations that are performed by the above-described program by 1. Of course, the length of time that is required for an iteration is insignificant relative to the general operation of the FIG. 1 arrangement.

ACD

As indicated above, the ACD function selects the telephone with the longest idle time. Accordingly, the telephone's idle time forms the selection criterion and, effectively, constitutes a changing ID of the telephone. This ID is incremented with the passage of each $\tau$ interval while the telephone is idle, where $\tau$ is a selected measuring granularity; for example, 1 sec. The telephone's ID is reset to zero when the telephone is not idle, and is kept at zero until the telephone becomes idle.

When the process initially starts, the maximum idle time of telephones 11–18 is not known to switching apparatus 200. However, one can select any arbitrarily large idle time to start the process, or reset the ID of all of the telephones to zero. Once some telephone has been selected—that telephone having an ID that is not smaller than the ID of all other telephones—switching apparatus 200 knows that the maximum idle time of any of the telephones (11–18) is not greater than the previously selected maximum time, plus the elapsed time since the last selection, $\Delta$; that is, $T+\lfloor\Delta/\tau\rfloor$, where T is the ID of the last-selected telephone. Knowing that the queried telephones can have an ID that spans the range from 1 to $T+\lfloor\Delta/\tau\rfloor$, a binary search can be performed to find the telephone with the largest ID. It can be easily shown that this binary search will require, at most, $\lceil\log Q\rceil$ query message-response iterations, where $\lceil\ \rceil$ symbol represents rounding up to the next integer, for example, $\lceil 3.1415\rceil=4$.

Advantageously $\tau$ is selected to be long enough so that $\lfloor\Delta/\tau\rfloor$ does not change during the binary search. Choosing a large value of $\tau$, which means choosing a coarse granularity, creates the possibility that two or more telephones that cease being idle within $\tau$ sec of each other will carry the same ID. Eventually, these telephones will be the telephones with the longest idle time. A possibility exists, therefore, that a telephone with the longest actual idle time is not selected, in favor of a telephone with a slightly shorter idle time that is within $\tau$ sec of the telephone with the longest idle time. In the above example, that can only generate a 1 sec discrepancy, which has no material effect, since the next polling times will definitely select from among those telephones that shared the same ID.

The binary search to find the telephone with the largest ID can be by means of a program executed by switching apparatus 200, as described below, where X designates the condition that a telephone exists with an ID that is between Mid and High, i.e., telephones were polled with the Mid and High information, and at least one of the telephones responded affirmatively:

| 1 |  | Low=1; High=T+$\lceil\Delta/\tau\rceil$ |
|---|---|---|
|  |  | Mid=$\lfloor$(Low + High)/2$\rfloor$ |
| 2 | Repeat: | IF (X) THEN |
| 3 |  |   Low = Mid |
| 4 |  | ELSE |
| 5 |  |   High = Mid−1 |
| 6 |  | END IF |
| 7 |  | IF High=0 THEN |
| 8 |  |   Send "busy" message; Go to End |
| 9 |  | ELSE IF High = Low THEN |
| 10 |  |   Terminal that sent message is the TBU terminal |
| 11 |  | ELSE |
| 12 |  |   Go to Repeat |
| 13 | End: | END IF |

Figure 2:
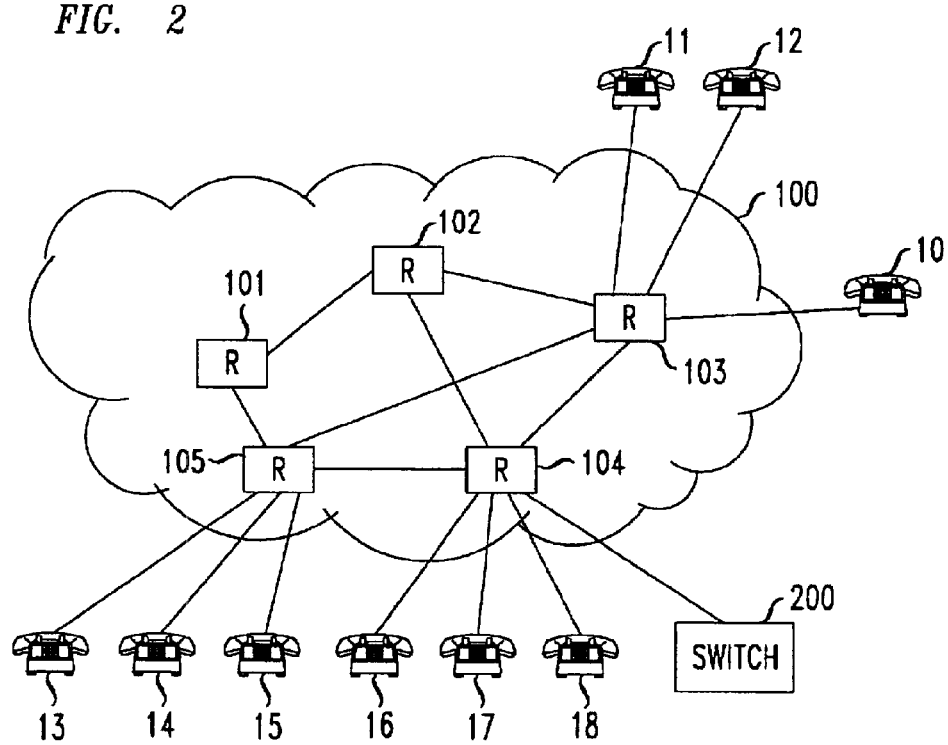
FIG. 2 presents another illustrative embodiment in accord with the principles of this invention.

FIG. 1 employs the principles of this invention in an arrangement where all of the telephones in a service group are coupled to switching apparatus 200 through bus 202. Bus 201 is merely illustrative, of course, and the same operation can be implemented with a network (e.g. local area network). Moreover, having a separate network is not a requirement of this invention. FIG. 2 depicts a network 100, for example, which may be an ATM network, with routers 101 through 105 to which telephones 10 through 18 are connected. As shown, telephones 10 through 18 are connected to different routers of the network 100 routers. Nevertheless, telephones 11 through 18 can form a service group, just as in the FIG. 1 embodiment. Switching apparatus 200 still implements the principles disclosed herein, except that the query and response message pass through the ATM network prior to call set-up.

What is claimed is:

1. A method for identifying an end point terminal within a service group of end point terminals as a to-be-used terminal, where each of said terminals is characterized by an ID comprising the steps of:

sending a message to said end point terminals, specifying a response criterion, requesting idle end point terminals that meet said response criterion to respond;

receiving one or more responses from said idle end point terminals that meet said response criterion;

based on a selected one of said responses, modifying said response criterion to form a changed response criterion; and based on information related to said response criterion either selecting the end point terminal that supplied the selected one of said responses as the to-be-used terminal, or returning to said step of sending a message, where the specified response criterion being said changed response criterion, wherein said response criterion specifies an end point terminal IDs range by providing an x value and a y value of, so that either only end point terminals that are included in said range send a response message, if they are idle, or only idle end point terminals determine whether they are included in said range and are thus enabled to send a response message each of said end point terminals, in determining whether its ID is within range of end point terminal IDs, compares its ID to said x value and to said y value, in the process subtracting from it's ID a value related to a constant supplied in said message, where the subtraction is performed in modulus arithmetic.

2. A method for identifying an end point terminal within a service group of end point terminals as a to-be-used terminal, where each of said terminals is characterized by an ID comprising the steps of:

sending a message to said end point terminals, specifying a response criterion, requesting idle end point terminals that meet said response criterion to respond;

receiving one or more responses from said idle end point terminals that meet said response criterion;

based on a selected one of said responses, modifying said response criterion to form a changed response criterion; and based on information related to said response criterion either selecting the end point terminal that supplied the selected one of said responses as the to-be-used terminal, or returning to said step of sending a message, where the specified response criterion beings said changed response criterion, wherein said response criterion specifies an end point terminal IDs range by providing an x value and a y value of, so that either only end point terminals that are included in said range send a response message, if they are idle, or only idle end point terminals determine whether they are included in said range and are thus enabled to send a response message each of said end point terminals, in determining whether its ID is within range of end point terminal IDs, compares its ID to said x value and to said y value, in the process adding to said x value and to said y value a value related to a constant supplied in said message, where the addition is performed in modulus arithmetic.

3. A method for identifying an end point terminal within a service group of end point terminals as a to-be-used terminal, where each of said terminals is characterized by a unique fixed ID comprising the steps of:

sending a message to said end point terminals, specifying a response criterion, requesting idle end point terminals that meet said response criterion to respond;

receiving one or more responses from said idle end point terminals that meet said response criterion;

based on a selected one of said response, modifying said response criterion to form a changed response criterion; and based on information related to said response criterion either selecting the end point terminal that supplied the selected one of said responses as the to-be-used terminal, or returning to said step of sending a message, where the specified response criterion being said change response criterion where the unique ID's of end point terminals are members of a set that includes numbers A through A+N, where A is a preselected integer, and N is the number of end point terminals in said service group.

* * * * *